L. C. KRUMMEL.
AUTOMATIC FLANGING MACHINE.
APPLICATION FILED JUNE 17, 1910.

1,194,038.

Patented Aug. 8, 1916.
6 SHEETS—SHEET 6.

Witnesses
C. H. Walker
Albert Popkins

Inventor
Louis C. Krummel
By
Sturtevant & Mason
Attorneys

UNITED STATES PATENT OFFICE.

LOUIS CHARLES KRUMMEL, OF CLINTON, CONNECTICUT, ASSIGNOR TO CONTINENTAL MACHINE COMPANY, OF SYRACUSE, NEW YORK, A CORPORATION OF NEW YORK.

AUTOMATIC FLANGING-MACHINE.

1,194,038.  Specification of Letters Patent.  Patented Aug. 8, 1916.

Application filed June 17, 1910. Serial No. 567,510.

*To all whom it may concern:*

Be it known that I, LOUIS CHARLES KRUMMEL, a citizen of the United States, residing at Clinton, in the county of Middlesex, State of Connecticut, have invented certain new and useful Improvements in Automatic Flanging-Machines, of which the following is a description, reference being had to the accompanying drawing and to the letters and figures of reference marked thereon.

The invention relates to new and useful improvements in machines for flanging can bodies.

An object of the invention is to provide a continuously operating machine having mechanism for forming a preliminary curl simultaneously at each end of the can body, and for subsequently forming a finished flange at each end of the can body.

A further object of the invention is to provide a continuously operating machine having a plurality of independently operated flanging stations, which move continuously and bodily, and which operate in succession to flange the can body at each end during the bodily travel of the flanging stations.

A further object of the invention is to provide a continuously operating machine having a plurality of rotating supports, each of which carries flanging dies, together with means for presenting the can bodies to be flanged, first to the flanging dies on one of the rotating supports where a preliminary curl may be formed at each end of the can body, and then to the flanging dies on the other rotating support, where a finished flange may be formed on each end of the can body.

A further object of the invention is to provide a rotatable support for can bodies which are to be presented to an operating mechanism, which support is constructed with arc-shaped members adapted to receive and hold the can body relative to the operating mechanism, which arc-shaped members are interchangeable, whereby said rotatable support may be used for different sized can bodies.

A further object of the invention is to provide a continuously operating machine having a plurality of bodily movable rotatable flanging dies with a combined body rest and stripper, which is bodily movable with said flanging dies and rotatably stationary relative to said dies for holding and presenting the can bodies to the flanging dies, and for stripping said can bodies from said flanging dies after flanges have been formed on each end of the can body.

These and other objects will in part be obvious, and will in part be hereinafter more fully described.

In the drawings which show by way of illustration, one embodiment of the invention.

In carrying out my invention, I have provided a frame which may be of any desired construction, and on said frame are located two independently rotating supports, each of which carries a plurality of flanging dies. The can body is first operated upon by a set of dies on one of the rotating supports, which operate to form a preliminary curl at each end of the can body, after which the can body automatically transfers to a pair of dies on the other rotating support, which operate upon said can body to form the finished flange. I have also provided means for automatically feeding can bodies to the machine, and for discharging the same from the machine after they are flanged.

Referring to the drawings more in detail, I have provided a frame which consists of a base portion 1, and upright standards 2 and 3, which are located at each end of the base portion. Cross rods 4, 5, and 6, are mounted in suitable projecting lugs carried by the upright standards 2 and 3, and serve as a means not only for strengthening the framework of the machine, but also as a means on which various parts of the mechanism for presenting the cans to the dies may be mounted.

My machine comprises two independently rotating supports which are carried by and movable with the shafts 7 and 8. Said shafts 7 and 8 are mounted in suitable bearings in the uprights 2 and 3, so as to rotate about a horizontal axis and as herein shown the shaft 7 is directly above the shaft 8. The shaft 7 extends through the upright standard 3, and carries a gear wheel 9, which meshes with a gear wheel 10 carried on the end of the shaft 8, which likewise projects through the upright 3. The gear wheel 10 meshes with a gear wheel 11 on the main shaft 12, which may be operated in any suitable way as by a belt wheel 13, and suitable clutching devices. A cover plate 14 is secured to the end of the machine, and covers the gear wheels 9, 10 and 11. It will be readily seen that the shaft 7 will rotate in one direction, and the shaft 8 will rotate in the opposite direction.

The operating mechanisms carried by the shafts 7 and 8, are similar in all respects, with the exception of the shape of the dies carried by the said shafts. The dies carried by the upper rotating shaft or support, are as herein shown four in number and are similarly constructed. Said dies are so shaped as to give a preliminary curl to each end of the can body. The dies carried by the lower rotating shaft or support 8, are also four in number, and are similarly constructed, said dies being shaped to form the finished flange on each end of the can body. Inasmuch as each one of the dies are operated in precisely the same way, a description of the operating mechanism for one die will be sufficient for an understanding of all the dies.

Figures 15, 16:
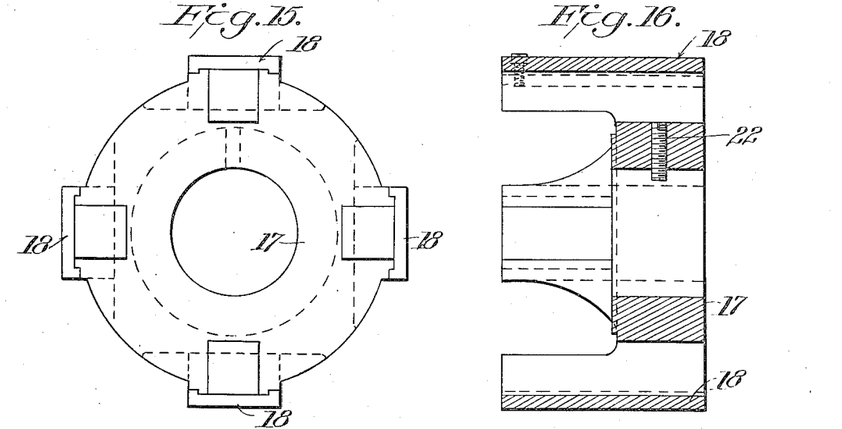
Fig. 15 is a side view on a reduced scale, of the supporting member in which the dies slide.
Fig. 16 is a sectional view through the same.

Each of the dies 15 is carried on the outer end of a rectangular shaped sliding bar 16, which is mounted to slide in a supporting member 17, shown in detail in Figs. 15 and 16. Said supporting member 17 has four rectangular recesses or pockets cut therein, which are spaced at ninety degrees apart. A cap plate 18 covers each recess or pocket and holds the sliding bar carrying the die in said pocket or recess.

The shaft 7 carries at the right hand end, a sleeve 19 which is rigidly secured to the shaft 7 by a set screw 20. Said sleeve near its outer end is provided with a flange 21. The supporting member 17 for the dies 15, at the right hand end of the upper support, is rigidly secured by a set screw 22, (see Fig. 16), to the sleeve 19 mounted on the shaft 7. The shaft 7 at the left hand end carries a second sleeve 23 which is secured to the shaft 7, by a spline 24. Said connection between the sleeve and shaft, causes the sleeve to rotate with the shaft and allows the same to be moved longitudinally on the shaft. The dies 15 at the left hand end of the machine, operate in the supporting member 17, which is secured to the sleeve 23, by a set screw 22, in the manner above described. The sleeve 23 carries a flange 25 at its outer end. A nut 26 is threaded on to the shaft 7 and carries a tapered flange at its inner end, which extends outwardly underneath a tapered projection carried by a ring 27 which is secured to the flange 25 by screws.

Figures 13, 14:
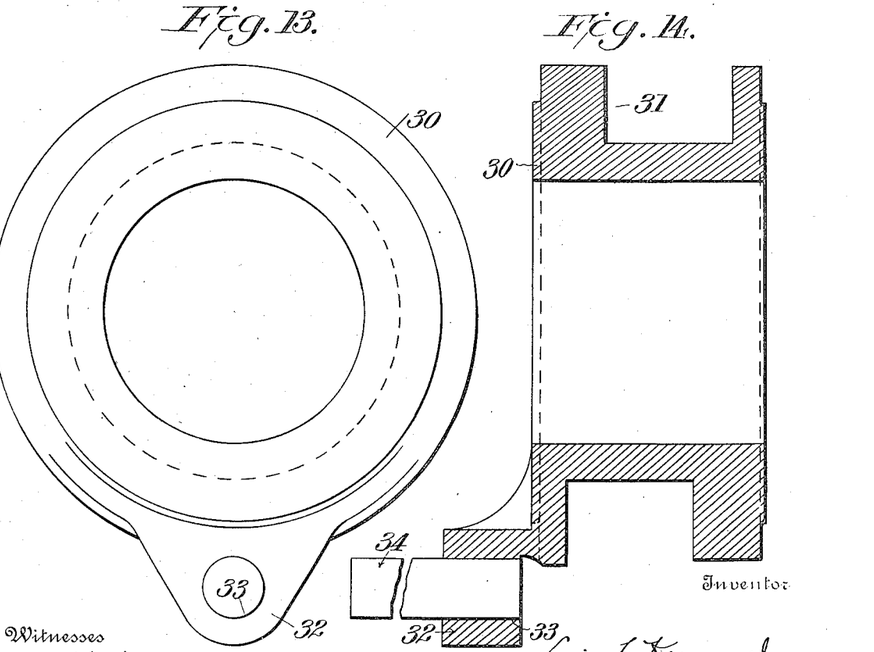
Fig. 13 is a side view of one of the cam disks for operating the dies.
Fig. 14 is a section through the same.

It will readily be seen that the nut 26 may rotate freely relative to the sleeve 23, and as said nut is rotated on the threaded shaft, the sleeve 23 will be moved longitudinally of the shaft 7. This adjustment of the sleeve 23 carries with it a corresponding adjustment of the supporting member for the dies. The shaft 8 carries a similar sleeve 19 at its right hand end, on which is mounted the support 17 for the dies 15. Said sleeve 19 is secured to the shaft 8 in the same way as the sleeve 19 is secured to the shaft 7. A sleeve 23 is also connected to the left hand end of the shaft 8 by a suitable spline, and carries a supporting member 17 for the dies 15. A threaded nut 26 engages a threaded portion of the shaft 8 and operates to adjust the sleeve 23 on the shaft 8 in the same manner as the sleeve 23 is adjusted on the shaft 7. Each of the sliding bars 16 which carry the dies is provided with a roller 28. Said roller is carried by a stud 29 mounted in the slide in any suitable way. A cam disk 30 shown in detail in Figs. 13 and 14, is provided with a cam groove 31 in its periphery, which is adapted to receive the roller 28 carried by each of the sliding bars, on which the dies are mounted.

The cam disks 30 at each end of the machine, are freely mounted on the sleeves 19 and 23, and are held from sidewise movement between the flange formed on the outer end of each sleeve and the supporting member for the dies. Each of the cam disks carries a projecting arm 32 which has an aperture 33 formed therein. Pins 34 are fixed in the apertures 33, and are adapted to engage suitable apertures in the standard 3. These pins 34 will hold the cam disks stationary so that the sleeves 19 and the supporting members for the dies will rotate relative to the cam disks. The cam disks at the opposite end of the machine are provided with similar projecting arms carrying pins 34, which pins 34 slidingly engage the upright standard 2. This sliding engagement between the pins 34 and the upright standard, allows the sleeves, together with the cam disks and the supports for the dies at the left hand side of the machine, to be adjusted toward and from the fixed sleeves and parts carried thereby at the other end of the machine. The cam grooves at each end of the machine are cut in the reverse order and as the supports rotate relative to said cam disks, the dies which are located opposite each other and arranged in pairs, will be simultaneously moved toward and from each other. First one pair and then another pair may move in and out by the rotation of the supports relative to the stationary cam disks.

Each of the flanging heads or dies 15 consists of a head proper 35, which is threaded directly on to the sliding bar 16. Said head carries a ring having an inwardly projecting flange 36, which ring is threaded on to the head 35 so that it may be readily detached therefrom. A limiting ring 38 which is made of hardened steel is adapted to be seated between the head 35 and the flange 37 on the retaining ring 36. By removing the retaining ring 36, the limiting ring 38 may be readily removed and replaced when desired, or reversed so as to bring a different portion thereof into position to receive the wear incident to the flanging operation.

Figure 5:
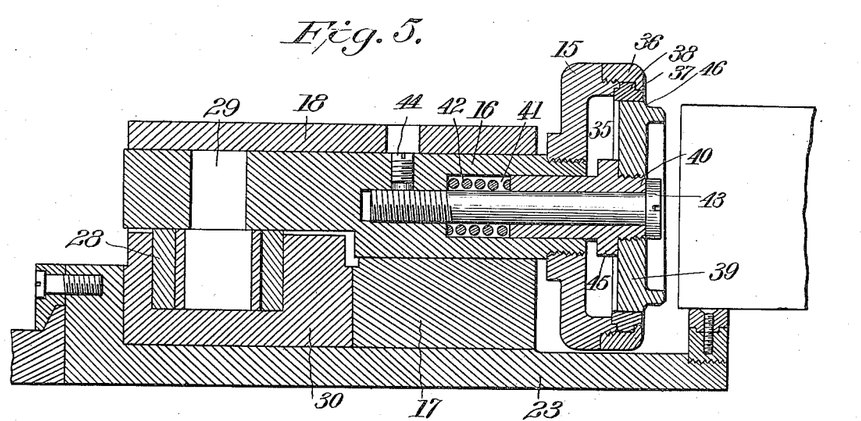
Fig. 5 is a longitudinal sectional view through one of the dies and the parts for supporting and operating the same.
Figures 7, 8, 10:
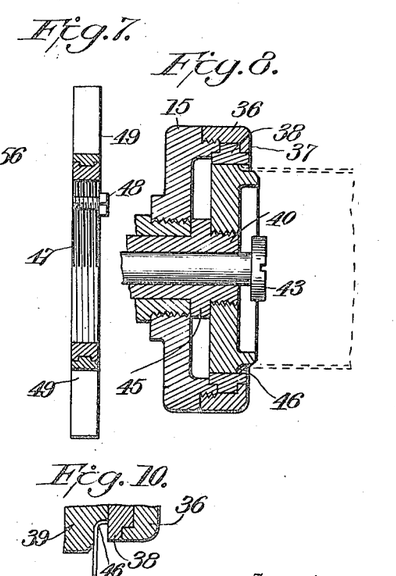
Fig. 7 is a sectional view through the combined body rest and stripper.
Fig. 8 is a sectional view through the flanging head or die, showing the position of the parts at the completion of the flanging operation.
Fig. 10 is a detail showing the shape of the die forming the preliminary curl.
Figure 9:
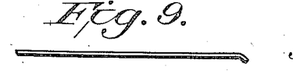
Fig. 9 shows a section of a can body having a preliminary curl formed on the end thereof.
Figure 11:
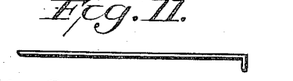
Fig. 11 shows a section of a can body with the finished flange on the end thereof.
Figure 12:
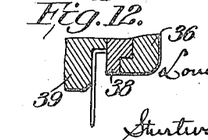
Fig. 12 is a detail showing the shape of the die for producing the finished flange.

The die proper, or flange forming member 39, is threaded on to the outer end of the stem 40 which is freely mounted in a recess 41 formed in the sliding bar 16. A spring 42 is located in the recess 41 and engages the end of the stem 40 and normally forces the same outward. A limiting screw 43 extends centrally through the stem 40 and is threaded into the sliding bar 16. A set screw 44, may be used to lock the limiting screw 43. Said stem 40 carries a laterally projecting shoulder 45, which is adapted to engage the outer end of a sliding bar 16 or the head of the die and limit the inward movement of said die. The die is normally in the position shown in Fig. 5, that is with said die stem in contact with the head of the limiting screw. When the die is forced against the end of the can body, the projecting portion of the die enters the can body and the edge of the can slides along the face of the die until it contacts with the curved flange turning portion 46 thereof. The die will then be forced inwardly, compressing the spring 42 until the shoulder 45 engages the outer end of the sliding bar, which supports the die after which there is no further yielding movement of the die, and said die is positively crowded into the can end to turn the flange. The outwardly turned edge of the can body as the flange is formed, comes into contact with the limiting ring of hardened material as clearly shown in Fig. 8. These two operations upon the can body in forming the finished flange have been found to be of great advantage. Applicant has found in practice that where an attempt is made to turn a flange in one operation, the metal by the sudden excessive bending did not have an opportunity to flow into the enlarged surface forming the finished flange, and therefore, said metal would split or the side seam of the can would be opened up. Then again, applicant has found in practice that it is impracticable to turn a flange which is located substantially at right angles to the body of a can, in a single operation. With my organized mechanism, I am able in a single machine to automatically perform the two operations upon the can body, first turning a preliminary flange and then a finished flange, which is properly shaped for the most effective double seaming operation. By my single organized mechanism, I am able therefore, to not only quickly put a proper flange on a can body, but to secure this result without splitting the edge of the metal or opening the side seam.

Another and most essential feature of my machine, consists in the relatively slow operation of turning the flange. In my machine, in which the flanging heads are caused to travel bodily, and one after another receive the can body so that each flanging head is given a considerable time to operate upon a can body before another can body is fed thereto, I am able to cause the flanging dies to move toward each other very slowly without in any way decreasing the out-put of the machine. By this slow movement of the flanging dies, the metal being bent is given an opportunity to flow and all liability of splitting is avoided.

As a means for positioning the can body in alinement with the dies, I have provided a pair of rest plates 47, 47, which are secured to the ends of the sleeves 19 and 23 in any desired way. Each rest plate is preferably threaded on to the end of the supporting sleeve as clearly shown in Fig. 5. In order that the rest plate may be held in a definite predetermined position relative to the sleeve, I have provided semi-cylindrical registering sockets in the rest plate and sleeve, which are adapted to receive bolts 48 to hold said rest plate from turning on the sleeve. Each rest plate is cut away adjacent the flanging die, and carries an arc shaped contact plate 49, which is secured to the rest plate by screws 50.

Figure 6:
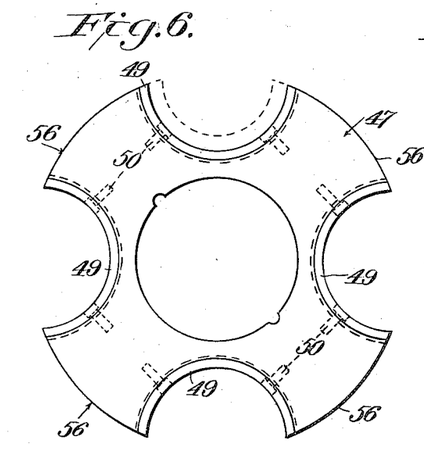
Fig. 6 is a detail showing the combined rest and stripper, and in dotted lines a different size plate for engaging the can body.

It will be seen that the arc-shaped plates 49 may be readily removed and other arc-shaped plates having the inner curved portion of smaller radius substituted therefor, as shown in dotted lines in Fig. 6.

When a can body is presented to the machine, it rests at each end on the arc-shaped rest plate and will properly be held in alinement with the dies so that as the dies move inward, they will properly engage the can body for flanging the same. After the flange has been completed on the can body and the dies are withdrawn from the can body, the outwardly turned flange will engage the rest plate if either die should in any way stick in the can body, and the rest plate will operate to strip the can body from the die. It will therefore, be seen that I have provided a combined body rest and stripper plate which not only holds the can body in alinement to the dies, but it will also hold the can body from endwise movement after the flange is turned so as to strip the can body from the dies.

Figure 1:
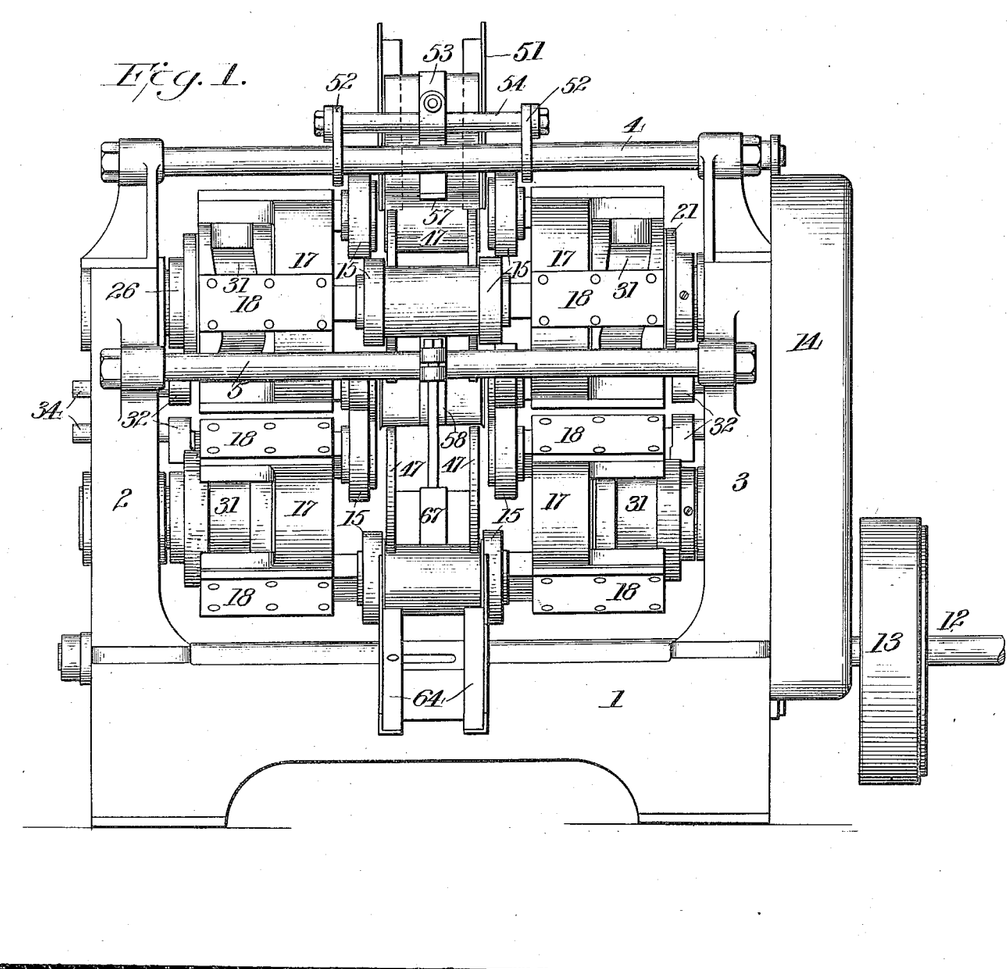
Figure 1 is a front elevation of a machine embodying my improvements.
Figures 2, 17:
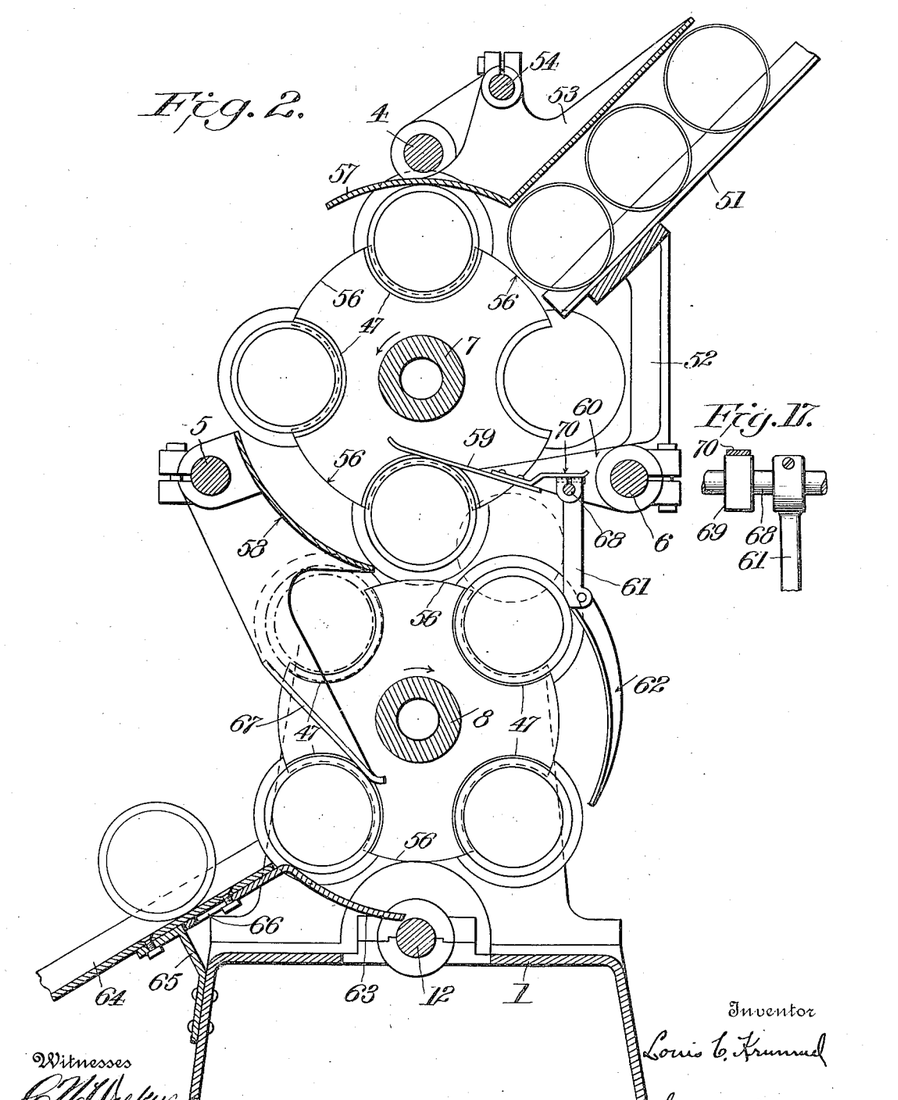
Fig. 2 is a vertical sectional view centrally through the machine.
Fig. 17 is a detail showing the manner of supporting the arm that holds the can bodies when being transferred.
Figure 3:
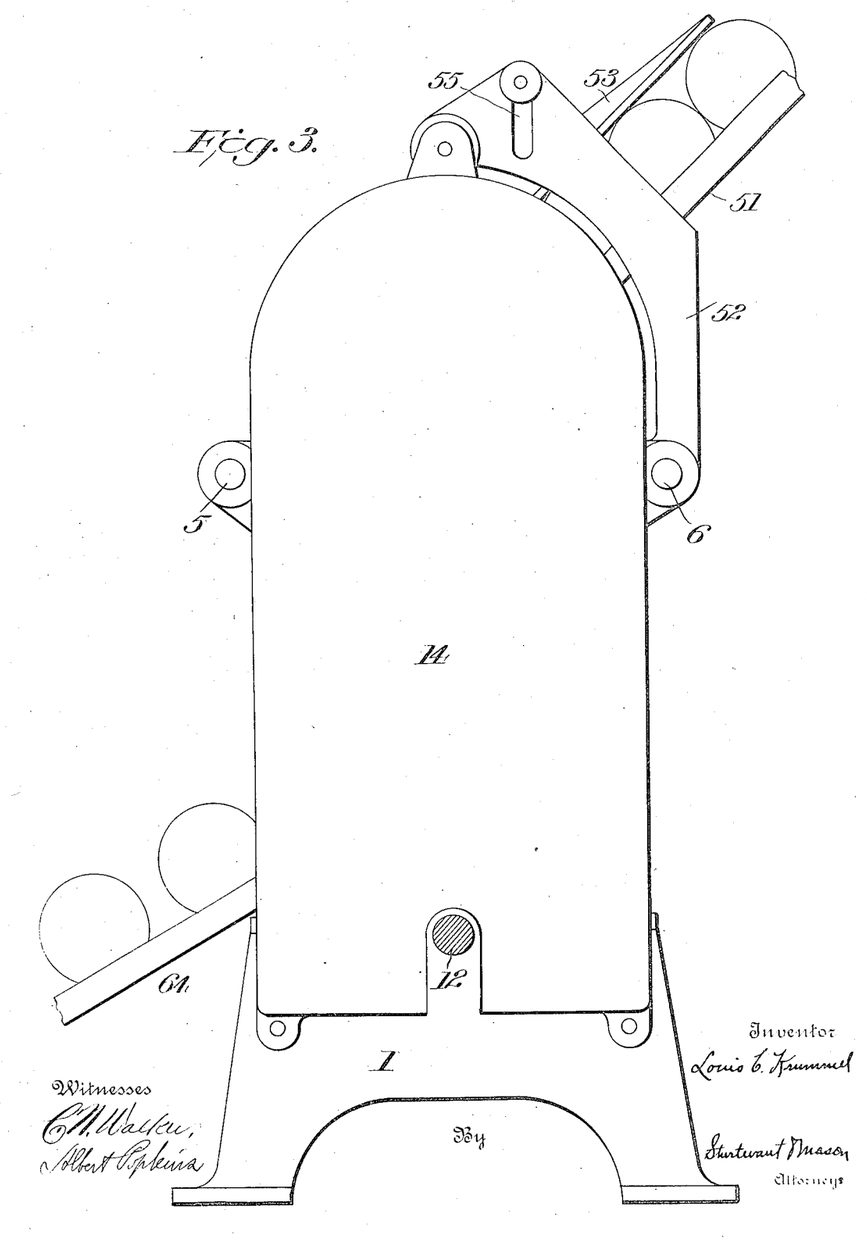
Fig. 3 is an end view of the machine.
Figure 4:
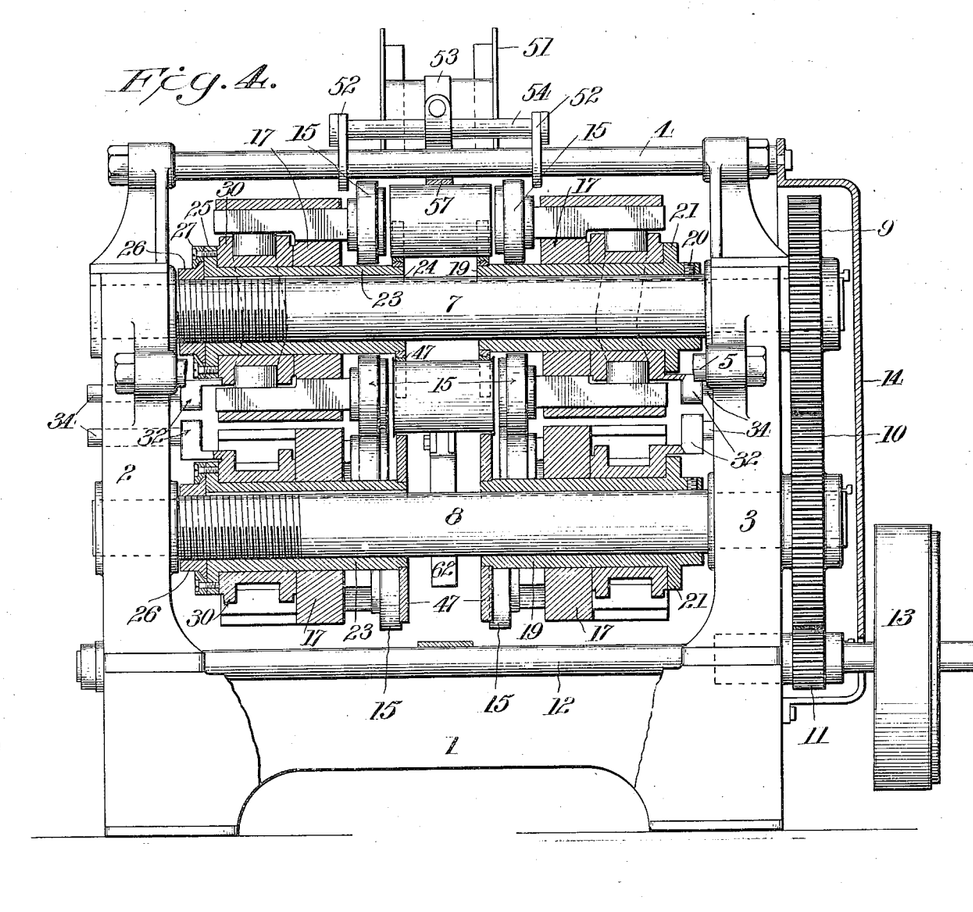
Fig. 4 is a vertical longitudinal sectional view through the rotating supports and the cover plate for the gears at the end of the machine.

The can bodies are fed to the machine at the upper end thereof by a suitable feed chute 51. Said feed chute consists of oppositely disposed angular guide rails which are mounted at the lower end upon a bracket 52, which is rigidly secured to the cross bars 4 and 6, (see Fig. 3). In order to prevent the can bodies from jumping from the feed chute, I have provided a protector plate 53 which is adjustably mounted on a cross bar 54. Said cross bar 54 is also vertically adjustable in a slot 55 formed in the bracket 52. The body rests 47 are not only provided with arc-shaped pockets which receive the can bodies and hold them in proper alinement for the operation of the dies, but are also provided with segmental portions 56, on which the can bodies rest to prevent the discharge of the can bodies from the feed chute until the pocket to receive the same is in proper alinement with the feed chute. The shaft 7 turns in the direction of the arrow as shown in Fig. 2. When a pocket in the body rest is opposite the feed chute, a can body will drop therein and be carried along with the body rest. A guide 57 carried by and forming an extension of the guide plate 53, will hold the can body properly positioned in the pocket of the body rest until received by the flanging dies. After the flanging operation has been performed, and the dies are withdrawn from the can body, a second guide plate 58 adjustably mounted on the cross bar 5, will hold the can body from dropping from the pocket in the body rest, so that said can body will be carried along with the body rest. In order that the can body may be forced from the body rest 47, if said can body in any way sticks in the rest, I have provided a stripper 59 which is carried by an arm 60 mounted on the cross bar 6. The can body therefore, will be stripped from the pocket in the upper body rest when said pocket reaches a point directly underneath the shaft 7 and said can body will roll to the position indicated in dotted lines in Fig. 2. In this position, the can body will rest on the segment 56 of the lower body rest and against the vertical face of an arm 61. The can body will be held in this position until the next pocket in the lower body rest is underneath the can body when it will drop by gravity into the pocket. The lower shaft 8 rotates in the direction of the arrow indicated in Fig. 2, that is, in a direction opposite to the direction of the shaft 7. A curved guiding arm 62 formed as an extension of the arm 61, will hold the can body in the pocket in the body rest, until said can body is properly entered by the dies. After the flanging operation of the lower set of dies is finished, the can body will drop on to a curved guiding member 63, and will be carried along the same and discharged into a chute 64. The discharge chute 64 is carried by a bracket arm 65. The guiding member 63 is slotted at 66 and adjustably secured to the under side of the chute 64. A stripper finger 67 is mounted on the arm which supports the guide 58 and will operate to force the cans with the finished flange from the pocket in the lower body rest into the discharge chute.

It is sometimes desirable to remove a can body from the machine after having been subjected to the first flanging operation, and in order that this may be accomplished, I have mounted the arm 61 on a short shaft 68, which is freely journaled in the arm 60 carried on the cross bar 6. The shaft 68 carries a rectangular stop 69, which engages a spring 70 also mounted on the arm 60. The spring 70 bearing against the flat face of the block 69, will hold the shaft 68 normally with the arm 61 in vertical position. When however, it is desired to swing the arm 61, the spring 70 will yield so that said arm may be swung to allow a can to be removed from the machine and the spring will hold the arm in either adjusted position.

In the operation of my machine, the can bodies roll freely down the feeding-in chute 51 and will rest upon the segment supporting portions of the body rest moving with the upper shaft until a pocket in the body rest is opposite the feed chute when the can will drop into the pocket and be carried along with the body rest. The pair of dies which form flanging stations are bodily movable with the rest for the bodies, so that one flanging station after another passes the feeding-in chute. The can body will be held in its receiving pocket by the guiding member 57, until the dies have entered the ends of the can body. The dies as above noted will be simultaneously moved inward, so as to flange simultaneously each end of the can. As soon as the can body is flanged, which occurs during a rotation of the shaft 7 through an arc of approximately 90 degrees, the dies are withdrawn from the can body so that it may be discharged from the upper body rest. The guide 58 will retain the can body in its pocket until the pocket reaches a position directly underneath the shaft 7, when said can body will drop from the pocket in the upper body rest, or be forced therefrom by the stripper 59. The can body which has received by the above operation a preliminary curl, will now rest on the supporting segment 56 of the lower body rest, and against the arm 61, until a pocket in the lower body rest moves underneath the can body, when said can body will drop into the pocket, and be carried along with the body rest. The pairs of dies forming the flanging stations of the lower support, move with the body rest and will be simultaneously brought forward into engagement with the can body in order to form simultaneously the finished flange at each end of the can body. The guiding arm 62 will hold the can body in its pocket in the lower can body rest, until it is grasped by the flanging dies. The flanging operation on the lower support occurs while said dies are bodily traveling through an arc of substantially ninety degrees. After the flanging operation is finished, the can body will drop from the pocket on to the guiding member 63, or will be forced therefrom, by a stripper finger 67, and will roll down the discharge chute.

When it is desired to adjust the machine for different sized can bodies, the arc-shaped plates in each of the body rests, are removed and another plate having a curved surface of proper diameter to receive the can body is substituted therefor. The guiding members 53 and 57 are adjusted by means of a slotted connection with the bracket 52, so as to position said guiding members relative to the feed chute, and the pocket in the body rest for the different sized can bodies. The guiding bar 62 carried by the bar 61 may be adjusted on the shaft 68 so as to properly hold the different sized can bodies in the pockets in the lower body rest. These adjustments will provide for the presenting of can bodies of different sizes to the flanging stations. The dies are removed from the sliding bars and other dies of a suitable size to flange the can body operated upon are substituted therefor. The nuts 26 are adjusted on the threaded shafts 7 and 8, so as to bring the sleeves carrying one set of dies and other operating parts closer to or farther from the dies on the opposite side of the machine, so as to properly coöperate in flanging the can body operated upon. These adjustments are all that are necessary in order to position the parts for operating upon different size can bodies.

It is obvious that various changes in the details of construction may be made without departing from the spirit of my invention, or sacrificing the main principles thereof.

Having thus particularly described my invention, what I claim as new and desire to secure by Letters Patent is:—

1. A flanging machine having in combination, continuously operating mechanism including a movable support, a plurality of flanging stations carried by said support, each flanging station having a support for the can body and flanging dies, a second movable support and a plurality of flanging stations carried thereby, each of which includes means for supporting the can body and flanging dies, and means for presenting the can body to a flanging station on one of said supports whereby a preliminary curl in each end of the can body may be formed, and means for subsequently presenting said can body to a flanging station on the other support, whereby a finished flange on each end of the can body may be formed.

2. A flanging machine having in combination, a plurality of supports rotating about horizontal axes, a flanging station carried by and moving bodily with each support, means for presenting a can body to the flanging station on one support, whereby a preliminary curl is formed in each end of the can body, and means for subsequently presenting said can body to the flanging station on the other support, whereby a finished flange is formed on each end of the can body.

3. A flanging machine having in combination, a plurality of oppositely rotating supports, a flanging station carried by each support, means for presenting a can body to the flanging station on one support whereby a preliminary curl is formed in each end of the can body, and means for subsequently presenting said can body to the flanging station on the other support, whereby a finished flange is formed on each end of the can body.

4. A flanging machine having in combination, a plurality of rotating supports, flanging stations carried by each support, and means for presenting can bodies first to a station on one support, and then to a station on the second support.

5. A flanging machine having in combination, a rotatable support, a plurality of sets of non-rotating dies, bodily movable with said support, means for presenting can bodies to said dies, and stationary cams operatively connected with said dies for moving the same toward and from each other for flanging the can bodies.

6. A flanging machine having in combination, supports rotating about horizontal axes in opposite direction, a plurality of pairs of movable non-rotating flanging dies carried by and bodily movable with each support, a combined body rest and stripper for each pair of dies movable with said supports, stationary cams operatively connected with said dies for moving the same in succession into and out of contact with the ends of the can bodies.

7. A flanging machine including in combination, supports rotating about horizontal axes in opposite directions, a plurality of pairs of non-rotating dies mounted on and bodily movable with each support, a combined body rest and stripper for each pair of dies, carried by and moving with said support, and stationary cams operatively connected with said dies, for moving the same into and out of contact with the ends of the can bodies presented thereto.

8. A flanging machine having in combination, supports rotating about horizontal axes in the opposite directions, a plurality of pairs of flanging dies carried by each support, a body rest for each pair of dies, means for automatically receiving a can body discharged from one support, and presenting the same to a body rest on the other support.

9. A flanging machine having in combination, a support rotating about a horizontal axis, a plurality of pairs of non-rotating flanging dies bodily movable with said support, a feed chute for conveying can bodies to said support, body rests forming receiving pockets one for each of the pairs of flanging dies, and means carried by said support intermediate said receiving pockets, for holding the can bodies in said chute until a receiving pocket is opposite the feed chute.

10. A flanging machine having in combination, a support rotating about a horizontal axis, a plurality of pairs of non-rotating flanging dies bodily movable with said support, a feed chute for feeding can bodies to said support, spaced disks carried by said support on which the can bodies in the feed chute rest while said support is rotating, said disks having pockets formed therein in alinement with the flanging dies for receiving a can body and presenting the same to the flanging dies.

11. A flanging machine having in combination, a rotatable support, a sleeve splined to said support to rotate therewith, a supporting member fixed to said sleeve a plurality of dies, a supporting bar for each die slidably carried by said supporting member, a cam carried by said sleeve and held from lateral movement thereupon, means for holding said cam from rotating with said sleeve, and means for adjusting said sleeve longitudinally of said support.

12. A flanging machine having in combination, a rotatable support, a sleeve fixed to said support, and rotating therewith, a supporting member fixed to said sleeve, a plurality of dies, a supporting bar for each die slidingly carried by said supporting member, a cam mounted on said sleeve, means for holding said cam stationary, a second sleeve splined to said support, and rotating therewith, a second supporting member carried by said last named sleeve, a plurality of dies coöperating with the first named dies, a bar carrying each of said dies, and slidably mounted in said last named support, a cam mounted on said last named sleeve, and held from lateral movement thereon, means for holding said cam from rotating, and means for adjusting said last named sleeve with the parts supported thereby relative to the first named sleeve and the parts supported thereby.

13. A flanging machine having in combination, a plurality of supports rotating about horizontal axes, a series of flanging dies carried by each support, a supporting pocket for each of the flanging dies, means for stripping the can body from the pockets in one of said supports after the flanging dies have operated upon said can bodies, and means against which said can bodies rest after being stripped from the pockets in one support until received by a pocket in the other support, said means against which the can bodies rest being movable whereby the can body may be removed from the machine.

14. A flanging machine including in combination, a continuously rotating support having a plurality of flanging stations, a second continuously rotating support having a plurality of flanging stations, means for presenting a can body to a flanging station on one support, where a preliminary curl is formed in the ends of the can bodies, and means for subsequently presenting said can bodies to a flanging station carried by the second rotating support, whereby a finished flange is formed at each end of the can bodies.

15. In a can-flanging machine, a rotating turret, a pair of oppositely disposed flanging dies carried thereby, each die adapted to engage circumferentially one end of a can body, combined with means for forcing said dies together, against a can body held between them, whereby the entire circumference of each end of the can body is simultaneously turned outwardly to form the flange, and for forcibly separating said dies to free the can body, and a stripping member arranged between said dies in the path of movement of the can body carried thereby.

16. In a can-flanging machine, a rotating turret, a series of pairs of oppositely disposed flanging dies, each die adapted to engage circumferentially one end of a can body, combined with means for forcing said dies together against a can body held between them, whereby the entire circumference of each end of the can body is simultaneously turned outwardly to form the flange, and for forcibly separating said dies to free the can body, means for feeding can bodies to said turret, and stripping means for removing the can bodies from the dies.

In testimony whereof I affix my signature, in presence of two witnesses.

LOUIS CHARLES KRUMMEL.

Witnesses:
   GEORGE A. HILLIARD,
   EZRA E. POST.